(12) United States Patent
Ishii

(10) Patent No.: US 9,384,296 B2
(45) Date of Patent: Jul. 5, 2016

(54) CHECK SYSTEM, INFORMATION PROVIDING SYSTEM, AND COMPUTER-READABLE INFORMATION RECORDING MEDIUM CONTAINING A PROGRAM

(75) Inventor: Kumiko Ishii, Tokyo (JP)

(73) Assignee: Rakuten, Inc., Tokyo (JP)

( * ) Notice: Subject to any disclaimer, the term of this patent is extended or adjusted under 35 U.S.C. 154(b) by 984 days.

(21) Appl. No.: 12/666,263

(22) PCT Filed: Jun. 27, 2008

(86) PCT No.: PCT/JP2008/061729
§ 371 (c)(1),
(2), (4) Date: Dec. 22, 2009

(87) PCT Pub. No.: WO2009/001926
PCT Pub. Date: Dec. 31, 2008

(65) Prior Publication Data
US 2010/0185724 A1     Jul. 22, 2010

(30) Foreign Application Priority Data

Jun. 27, 2007  (JP) ................................ 2007-169642
Dec. 28, 2007  (JP) ................................ 2007-339395

(51) Int. Cl.
*G06F 15/16*  (2006.01)
*G06F 3/00*   (2006.01)
(Continued)

(52) U.S. Cl.
CPC .......... *G06F 17/30899* (2013.01); *G06F 21/51* (2013.01); *H04L 63/1433* (2013.01); *G06F 2221/2119* (2013.01)

(58) Field of Classification Search
CPC ............ G06F 17/30905; G06F 3/0481; G06F 9/4443; G06F 3/04842
USPC .......... 709/217, 219, 228; 715/711, 714, 717, 715/735, 738–739, 748, 764–769, 783, 788, 715/790, 793–797, 802, 808, 856
See application file for complete search history.

(56) References Cited

U.S. PATENT DOCUMENTS 5,430,839 A * 7/1995 Jagannathan et al. ........ 715/802
5,649,103 A * 7/1997 Datta et al. .................... 709/203
(Continued)

FOREIGN PATENT DOCUMENTS

| JP | 3422897     | 4/2003  |
|----|-------------|---------|
| JP | 2004-334705 | 11/2004 |
| JP | 2006-146743 | 6/2006  |

OTHER PUBLICATIONS

"Tokushu 2 Gensen Tool no Tsumeawase," *Net Runner*, 2007, vol. 9, No. 5., starting p. 67 (consisting of 6 pages).
(Continued)

*Primary Examiner* — Madhu Woolcock
(74) *Attorney, Agent, or Firm* — Ohlandt, Greeley, Ruggiero & Perle, L.L.P.

(57) ABSTRACT

In order to provide an information providing system appropriate for acquiring information associated with text contained in a Web document, a plugin program is executed in a client device, and settings in a dispatch unit are modified. Specification of text in a Web document by an input reception unit, acquisition of text from the Internet by a document acquisition unit, and display on a screen by a document display unit are hooked when required. When a first type instruction specifying a URL is input with the input reception unit, a document is acquired by a document acquisition unit. When a second type instruction is input, an associated information acquisition unit queries a plurality of server devices with the text, and an associated information display unit displays the associated information provided in a popup. Thus, in addition to the Web document, a user is presented with associated information such as the safety of the URL, translation results of the text into various languages, and ads highly relevant to the text.

1 Claim, 12 Drawing Sheets

(51) Int. Cl.
*G06F 3/048* (2013.01)
*G06F 17/30* (2006.01)
*G06F 21/51* (2013.01)
*H04L 29/06* (2006.01)

(56) References Cited

U.S. PATENT DOCUMENTS

| | | | |
|---|---|---|---|
| 6,466,937 B1 * | 10/2002 | Fascenda | 707/622 |
| 6,750,858 B1 * | 6/2004 | Rosenstein | 715/790 |
| 7,207,008 B1 * | 4/2007 | Koch | G06F 9/542 705/34 |
| 7,250,955 B1 * | 7/2007 | Beeman | G06F 9/4443 345/592 |
| 7,353,246 B1 * | 4/2008 | Rosen | G06F 17/30855 707/999.01 |
| 7,493,403 B2 * | 2/2009 | Shull et al. | 709/229 |
| 7,603,341 B2 * | 10/2009 | Martin et al. | |
| 7,668,811 B2 * | 2/2010 | Janssens et al. | 707/719 |
| 7,895,516 B2 * | 2/2011 | Harrop et al. | 715/239 |
| 7,904,335 B2 * | 3/2011 | Crim | 705/14.4 |
| 8,135,620 B2 * | 3/2012 | Barsade | G06Q 30/02 705/14.59 |
| 8,725,792 B1 * | 5/2014 | Pik | 709/203 |
| 2001/0005856 A1 * | 6/2001 | Tomikawa et al. | 709/208 |
| 2002/0087667 A1 * | 7/2002 | Andersen | 709/220 |
| 2003/0046664 A1 * | 3/2003 | Pangburn | 717/125 |
| 2004/0139223 A1 * | 7/2004 | Caplin | 709/237 |
| 2005/0066366 A1 * | 3/2005 | Takamine | 725/59 |
| 2005/0081158 A1 * | 4/2005 | Hwang | G06Q 30/02 715/740 |
| 2005/0149880 A1 * | 7/2005 | Postrel | G06F 3/0482 715/808 |
| 2006/0007875 A1 * | 1/2006 | Andersen | G06F 17/30899 370/314 |
| 2006/0041837 A1 * | 2/2006 | Amir et al. | 715/513 |
| 2006/0101514 A1 * | 5/2006 | Milener et al. | 726/22 |
| 2006/0173751 A1 * | 8/2006 | Schwarze | G06Q 30/0603 705/26.61 |
| 2006/0190838 A1 * | 8/2006 | Nadamoto | G06F 9/4443 715/781 |
| 2006/0218247 A1 * | 9/2006 | Sauve et al. | 709/219 |
| 2006/0230156 A1 * | 10/2006 | Shappir et al. | 709/227 |
| 2007/0055766 A1 * | 3/2007 | Petropoulakis et al. | 709/224 |
| 2007/0070066 A1 * | 3/2007 | Bakhash | 345/419 |
| 2007/0112949 A1 * | 5/2007 | Lunenfeld | 709/223 |
| 2007/0128899 A1 * | 6/2007 | Mayer | 439/152 |
| 2007/0143273 A1 * | 6/2007 | Knaus et al. | 707/3 |
| 2007/0185883 A1 * | 8/2007 | Naick et al. | 707/10 |
| 2007/0208704 A1 * | 9/2007 | Ives | G06F 17/30905 |
| 2008/0004929 A9 * | 1/2008 | Raffel et al. | 705/8 |
| 2008/0148188 A1 * | 6/2008 | Read | G06F 17/30905 715/841 |
| 2008/0155060 A1 * | 6/2008 | Weber et al. | 709/218 |
| 2008/0172362 A1 * | 7/2008 | Shacham et al. | 707/3 |
| 2010/0011301 A1 * | 1/2010 | Binyamin | H04L 67/16 715/748 |
| 2010/0325696 A1 * | 12/2010 | Jeon et al. | 726/3 |

OTHER PUBLICATIONS

"Ura Tool Kojin Joho Roei Boshi Tool," *Net Runner*, 2006, vol. 8, No. 11, pp. 94-97 (with additional 5 pages).

"IE o Kino Kakucho'Migi Click Launcher'v8.13," 2003, http://web.archive.org/web/20030628111442/http:/www.forest.impress.co.jp/article/2003/04/07/okiniiri.html, consisting of 1 page.

International Search Report dated Oct. 14, 2008 for corresponding International Application No. PCT/JP2008/061729.

* cited by examiner

CHECK SYSTEM, INFORMATION PROVIDING SYSTEM, AND COMPUTER-READABLE INFORMATION RECORDING MEDIUM CONTAINING A PROGRAM

BACKGROUND

1. Field of the Disclosure

The present disclosure relates to a check system favorable for easily checking the safety of a Web document before viewing on a browser, a computer-readable information recording medium containing a program executed on a computer that constitutes such a check system, an information providing system favorable for viewing information associated with text in a Web document being viewed in a browser, and to a computer-readable information recording medium containing a program executed on a computer that constitutes such an information providing system.

2. Discussion of the Background Art

For some time, a WWW (World Wide Web) system has been provided, wherein documents placed on the Internet are viewed from a user's client device. An application for viewing such Web documents is called a browser, and a variety of browsers from various companies have been proposed.

Among the services usable via a browser, there exist some wherein Web documents created in a foreign language are translated into the user's native language. For example, in one system, the user uses a CGI (Common Gateway Interface) to inform a translation server of the URL (Universal Resource Locator) of a Web document for which a translation is desired. The translation server acquires and then translates the document, and then provides the translated document for display in the user's browser.

In addition, in the following literature there is disclosed technology whereby a browser acquires a text string displayed near a mouse cursor by hooking to a system call of a running operating system, and then shows a popup display with the translated result of the text string.

Patent Literature 1: Japanese Patent No. 3422897.

Typically, when the user desires to view a given Web document, the user might want to hear the opinion of a third party who is neither the user himself or herself, nor the Web document provider. For example, the above translation service can be thought of as providing translated text of the Web document as an "opinion of a third party".

Meanwhile, although the Web is a trove of useful information, it is undeniable that malicious content is also provided. Consequently, it is conceivable to check whether or not a Web document is safe before the user views the document by classifying the Web document using Bayesian filter or other technology used in spam filters, on the basis of the frequency of words contained in the Web document.

Also, techniques providing pre-emptive protection are also possible, wherein a blacklist storing the hostnames and IP addresses of malicious sites is periodically downloaded to the client device, and warnings are given against accessing such sites.

In addition, in some cases it is desirable to acquire information associated with the text contained in the Web document from a plurality of server devices as a third-party opinion.

SUMMARY

However, if such advance checking is to be conducted on the client device used by the user, a problem occurs in that the processing load on the client device increases. There is also the potential that the blacklist itself will be very large and consume memory area in the client device. Furthermore, in the technique wherein the blacklist is periodically downloaded, the blacklist might not always be up-to-date, and the possibility exists that the user might enter a dangerous site.

On the other hand, there exists demand to conduct advance checking similar to that of a spam filter, even for sites not found on a blacklist. However, when applying the technology disclosed in Patent Literature 1, there is a problem in that the processing resources of the client devices are expended. Moreover, since processing is conducted to hook the operating system itself, unnecessary processing is conducted for aspects other than Web document viewing.

Furthermore, acquiring associated information from a plurality of server devices as a third-party opinion requires appropriately presenting the associated information to the user.

Being devised in order to solve such problems, the present disclosure has as an object to provide a check system favorable for easily checking the safety of a Web document before viewing on a browser, a computer-readable information recording medium containing a program executed on a computer that constitutes such a check system, an information providing system favorable for viewing information associated with text in a Web document being viewed in a browser, and to a computer-readable information recording medium containing a program executed on a computer that constitutes such an information providing system.

In order to achieve the above object, the following embodiments are disclosed in accordance with the principle of the present disclosure.

A check system in accordance with a first aspect of the present disclosure is provided with a client device and a server device, and is configured as follows.

The client device is provided with a document acquisition unit, a document display unit, a safety information acquisition unit, a safety information display unit, an input reception unit, and a dispatch unit.

Herein, the document acquisition unit acquires a Web document associated with a provided URL from a computer communication network.

Meanwhile, once a Web document is acquired by the document acquisition unit, the document display unit displays the acquired Web document on a screen.

Additionally, the safety information acquisition unit acquires safety information with respect to a provided URL from a server device.

Once safety information with respect to a URL contained in the Web document displayed on the screen is acquired by the safety information acquisition unit, the safety information display unit displays the safety information near the location where the URL is displayed on the screen.

Meanwhile, the input reception unit receives a first type or a second type instruction specifying a URL contained in the Web document displayed on a screen.

Additionally, when the first type instruction has been received, the dispatch unit provides the URL specified by the first type instruction to the document acquisition unit. When the second type instruction has been received, the dispatch unit provides the URL specified by the second type instruction to the safety information acquisition unit.

Meanwhile, the server device is provided with a safety information storage unit and a safety information providing unit.

Herein, the safety information storage unit stores a URL and safety information with respect to that URL in association with each other.

Meanwhile, the safety information providing unit provides a client device with safety information stored in the safety information storage unit in association with a queried URL from the client device.

A program in accordance with another aspect of the present disclosure is provided with a plugin program executed on a client computer operating a browser program, and a server program executed on a server computer, and is configured as follows.

First, the browser program causes the client computer to function as: a document acquisition unit that acquires a Web document associated with a provided URL from a computer communication network; a document display unit that displays an acquired Web document on a screen when the Web document is acquired by the document acquisition unit; an input reception unit that receives a first type or second type instruction specifying a URL contained in the Web document displayed on the screen; and a dispatch unit that provides the URL specified by the instruction to means associated with the instruction type.

Herein, the browser program associates the document acquisition unit with the first type instruction in the dispatch unit.

Meanwhile, the plugin program causes the client computer to function as: a safety information acquisition unit that acquires safety information with respect to a provided URL from a server device; and a safety information display unit that displays safety information on the screen near the displayed location of a URL when safety information with respect to that URL contained in the Web document displayed on the screen is acquired by the safety information acquisition unit.

Herein, the plugin program associates the safety information acquisition unit with the second type instruction in the dispatch unit.

Additionally, the server program causes the server computer to function as: a safety information storage unit that stores a URL and safety information with respect to that URL in association with each other; and a safety information providing unit that provides the client computer with safety information stored in the safety information storage unit in association with a queried URL from the client computer.

Also, the program of the present disclosure may be recorded onto a computer-readable information recording medium, and configured as follows.

Specifically, the plugin program may cause the client computer to function as a view hook unit that notifies the server device that a provided URL will be viewed, and then provides the URL to the document acquisition unit. The plugin program associates the view hook unit, rather than the document acquisition unit, with the first type instruction in the dispatch unit.

Meanwhile, the server program additionally causes the server computer to function as: a notification reception unit that receives a view notification from the client computer; and a safety information update unit that, for each URL stored in the safety information storage unit, updates the safety information associated with that URL with the number of times that the safety information has been queried, and the number of times that a view notification has been received.

An information providing system in accordance with another aspect of the present disclosure is provided with a client device and a plurality of server devices, and is configured as follows.

Specifically, the client device is provided with a document acquisition unit, a document display unit, an associated information acquisition unit, an associated information display unit, an input reception unit, and a dispatch unit.

Herein, the document acquisition unit acquires, from a computer communication network, a Web document associated with a URL indicated by given text.

Meanwhile, once a Web document is acquired by the document acquisition unit, the document display unit displays the acquired Web document on a screen.

Additionally, the associated information acquisition unit respectively acquires information associated with given text from the plurality of server devices.

Once associated information with respect to the text contained in the Web document displayed on the screen is acquired by the associated information acquisition unit, the associated information display unit displays the associated information near the location where the text is displayed on the screen.

Meanwhile, the input reception unit receives a first type or a second type instruction specifying text contained in the Web document displayed on the screen.

Additionally, when the first type instruction has been received, the dispatch unit provides the text specified by the first type instruction to the document acquisition unit. When the second type instruction has been received, the dispatch unit provides the text specified by the second type instruction to the associated information acquisition unit.

Meanwhile, each of the plurality of server devices is provided with an associated information storage unit and an associated information providing unit Herein, the associated information storage unit stores text and information associated with that text in association with each other.

Meanwhile, the associated information providing unit provides a client device with associated information stored in the associated information storage unit in association with queried text from the client device.

A program in accordance with another aspect of the present disclosure may be recorded onto a computer-readable information recording medium. The program may be provided with a plugin program executed on a client computer operating a browser program, and a server program respectively executed on a plurality of server computers, and may be configured as follows.

First, the browser program causes the client computer to function as: a document acquisition unit that acquires, from a computer communication network, a Web document associated with a URL indicated by given text; a document display unit that displays an acquired Web document on a screen when the Web document is acquired by the document acquisition unit; an input reception unit that receives a first type or second type instruction specifying text contained in the Web document displayed on the screen; and a dispatch unit that provides the text specified by the instruction to means associated with the instruction type.

Herein, the browser program associates the document acquisition unit with the first type instruction in the dispatch unit.

Meanwhile, the plugin program causes the client computer to function as: an associated information acquisition unit that respectively acquires information associated with given text from a plurality of server devices; and an associated information display unit that displays associated information near the displayed location of text on the screen when information associated with that text contained in the Web document displayed on the screen is acquired by the associated information acquisition unit.

Herein, the plugin program associates the associated information acquisition unit with the second type instruction in the dispatch unit.

Additionally, the server program respectively causes the plurality of server computers to function as: an associated information storage unit that stores text and information associated with that text in association with each other; and an associated information providing unit that provides the client computer with associated information stored in the associated information storage unit in association with queried text from the client computer.

Also, the program may be configured as follows.

Specifically, the plugin program may cause the client computer to function such that, every time associated information is acquired from a plurality of server computers by the associated information acquisition unit, the associated information display unit displays the associated information by adding the associated information as text to be displayed within a predetermined region near the displayed location of the text on the screen.

In addition, the program may be configured as follows.

Specifically, the plugin program may cause the client computer to function such that, every time associated information is acquired from a plurality of server computers by the associated information acquisition unit, the associated information display unit operates as follows. If associated information is already being displayed near the displayed location of the text on the screen, the associated information display unit shifts and stacks the acquired associated information behind the associated information already being displayed. If the text expressing one of the sets of associated information displayed stacked on the screen is specified, then the associated information display unit moves the associated information expressed by that text to the front for display. The input reception unit additionally receives a third instruction specifying text expressing one of the sets of associated information displayed stacked on the screen. In the dispatch unit, the third type instruction is associated with the associated information display unit.

Furthermore, these programs may be recorded onto a computer-readable information recording medium, such as a compact disc, flexible disk, hard disk, magneto-optical disc, digital video disc, magnetic tape, or semiconductor memory.

One of the above programs may be distributed or sold via a computer communication network, independently of the computer upon which the program is executed. Also, the information recording medium may be distributed or sold independently of the computer.

According to the present disclosure, there can be provided a check system favorable for easily checking the safety of a Web document before viewing on a browser, a computer-readable information recording medium containing a program executed on a computer that constitutes such a check system, an information providing system favorable for viewing information associated with text in a Web document being viewed in a browser, and a computer-readable information recording medium containing a program executed on a computer that constitutes such an information providing system.

DETAILED DESCRIPTION OF THE PREFERRED EMBODIMENT

An embodiment of the present disclosure will now be described. Hereinafter, in order to ease understanding, an embodiment will be described wherein the present disclosure is applied to a typical information processing apparatus. However, the present disclosure may be similarly applied to information processing apparatus such as various game devices, PDAs, and mobile phones. In other words, the embodiment described hereinafter is for the purpose of explanation, and does not limit the scope of the present disclosure herein. Consequently, although it is possible for persons skilled in the art to adopt embodiments wherein some or all of the elements herein have been substituted with respective equivalents, such embodiments are also to be included in the scope of the present disclosure.

Embodiment 1

Figure 1:
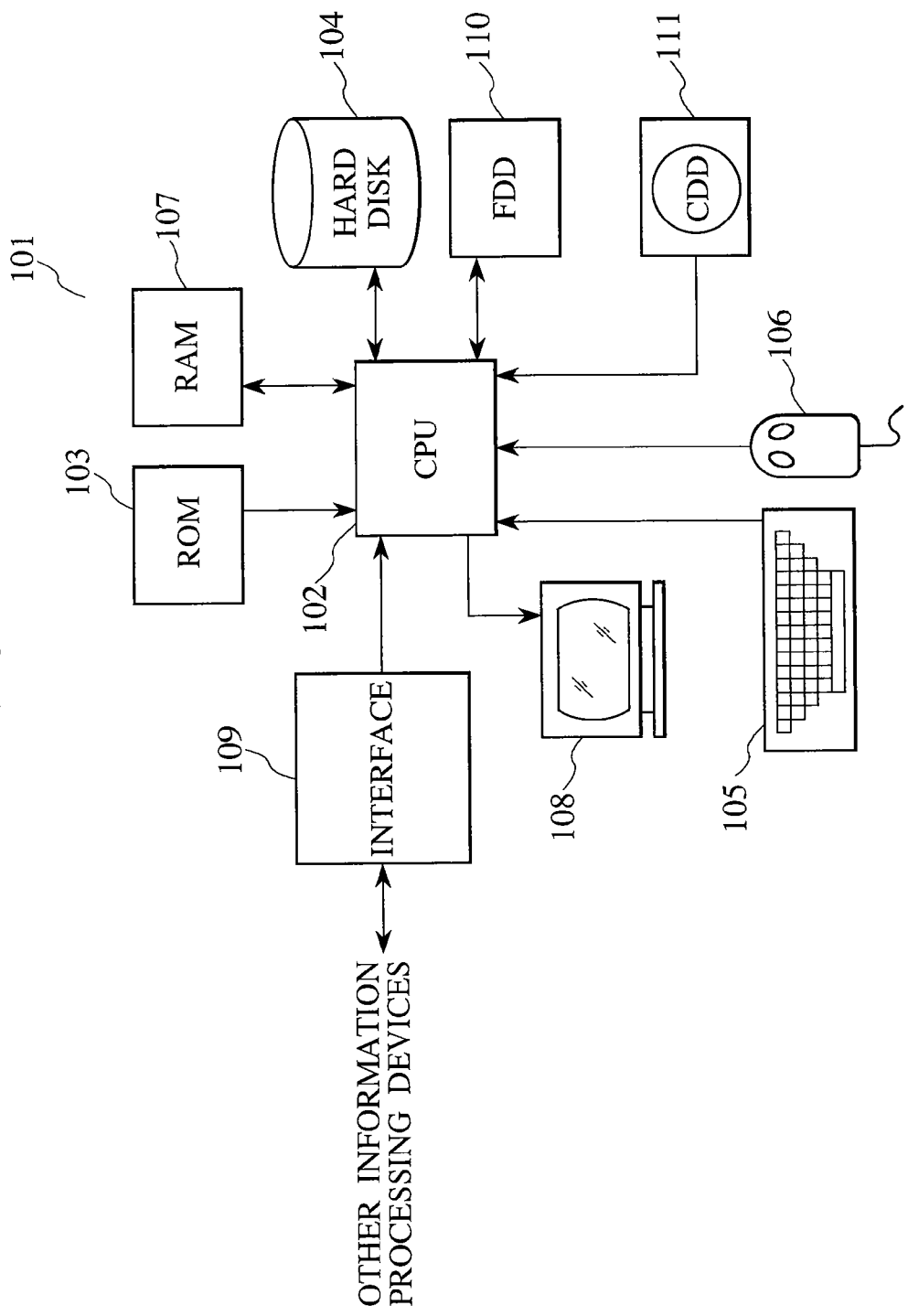
FIG. 1 is a schematic diagram illustrating the general configuration of a typical information processing apparatus whereby a server device or client device in accordance with an embodiment of the present disclosure is realized.

FIG. 1 is a schematic diagram illustrating the general configuration of a typical information processing apparatus whereby a server device or client device in accordance with an embodiment of the check system of the present disclosure is realized. Hereinafter, the description will refer to FIG. 1.

The information processing apparatus 101 is controlled by a CPU (Central Processing Unit) 102. When power is input into the information processing apparatus 101, the CPU 102 executes an IPL (Initial Program Loader) stored in the ROM 103.

The IPL is a program that reads out and executes an OS (Operating System) program stored on a recording medium such as the hard disk (HD) 104, an FD loaded into the FD drive 110, or a CD-ROM loaded into the CD-ROM drive (CDD) 111.

After launching the OS, the CPU 102 executes an application program stored in the hard disk or elsewhere by following either user instructions input using the keyboard 105, mouse 106, or other means, or by following the contents of a configuration file written in advance on the hard disk or elsewhere.

Herein, in the server computer, a server program is equivalent to the application program, while in the client computer, a browser program and a plugin program that adds functions to the browser program are equivalent to the application program.

By operating means such as the keyboard 105 and the mouse 106, various information is input. The various information is recorded onto a recording medium such as the hard disk 104, an FD loaded into the FD drive 110, or a CD-ROM loaded into the CD-ROM drive 111.

During execution of a program, the CPU 102 uses the RAM 107 as a temporary work storage area. In addition to this, registers and cache (not shown in the drawings) provided within the CPU 102 are used as temporary work storage areas.

In order to show interim progress while executing a program, the CPU 102 is able to display relevant information on a display device 108 such as a liquid-crystal display or CRT (Cathode Ray Tube). By using pointing operations with the mouse 106 to move the mouse 106, a cursor displayed on the screen is moved, and by clicking the mouse 106, the cursor is able to select the menu item that the cursor is pointing at.

The information processing apparatus 101 is able to communicate with the Internet or other computer communication network via an interface 109 such as a NIC (Network Interface Card) or modem. By processing character input received via the interface 109 or sending output text via the interface 109, a program received via the interface 109 can be executed, for example.

Under conditions where a typical browser program is operating on the client computer, if a Web document is being displayed on-screen, then anchors for other Web documents are displayed on-screen.

With the default operation of a browser program, or in other words, when a plugin program is not installed, if the user uses the mouse 106 to single-click an anchor, then the Web document placed at the URL of the anchor on the Internet is acquired, and the acquired Web document is displayed on-screen.

Thereafter, by repeating this process, the user is able to subsequently view Web documents linked by anchors specifying their URLs.

If a plugin program is installed, then operation different from the default operation can be made to be executed when given instructions by the mouse 106. In the present embodiment, if an anchor is double-clicked, then a server device is queried for information on whether or not the anchor destination URL is safe, and the results are displayed on-screen.

In addition, the operation when an anchor is single-clicked may be the same as the above default operation. Alternatively, a server device may be notified that the anchor destination URL will be viewed, and after reporting that the user selected that anchor, the above default operation may be executed, and the Web document at that URL may be viewed.

Hereinafter, in order to ease understanding, an embodiment that conducts the notification will be described. Also, various operations instead of double-clicking may be set as the instructions for querying safety information. For example, the mouse cursor may be placed near the anchor for at least a fixed amount of time, or the anchor may be single-clicked while holding the Shift key.

Typically, it is possible to assume that the safety of a provided URL lowers with increases in the number of safety information queries for that URL. Meanwhile, the safety of that URL rises with increases in the number of notifications indicating that the URL will be viewed. This is because the totals for the above counts are determined not just with one user, but with many users.

In other words, in the present embodiment, the counts are totaled without distinguishing which user's device conducted a query or notification. Information on how each user himself or herself performed checking or viewing behavior is accumulated, and then used to determine the safety of a Web document.

Thus, in the present embodiment, (1) when a site is determined to have malicious intent, safety information to that effect is designated, and (2) when a site is not determined to have malicious intent, the Web document is acquired, either in response to the query from the client device, or by crawling in advance. Then, when determining safety using Bayesian filters or other technology, the past query count and view notification count for that URL are also considered as part of the safety information. Further details are described below.

(Server Device)

Figure 2:
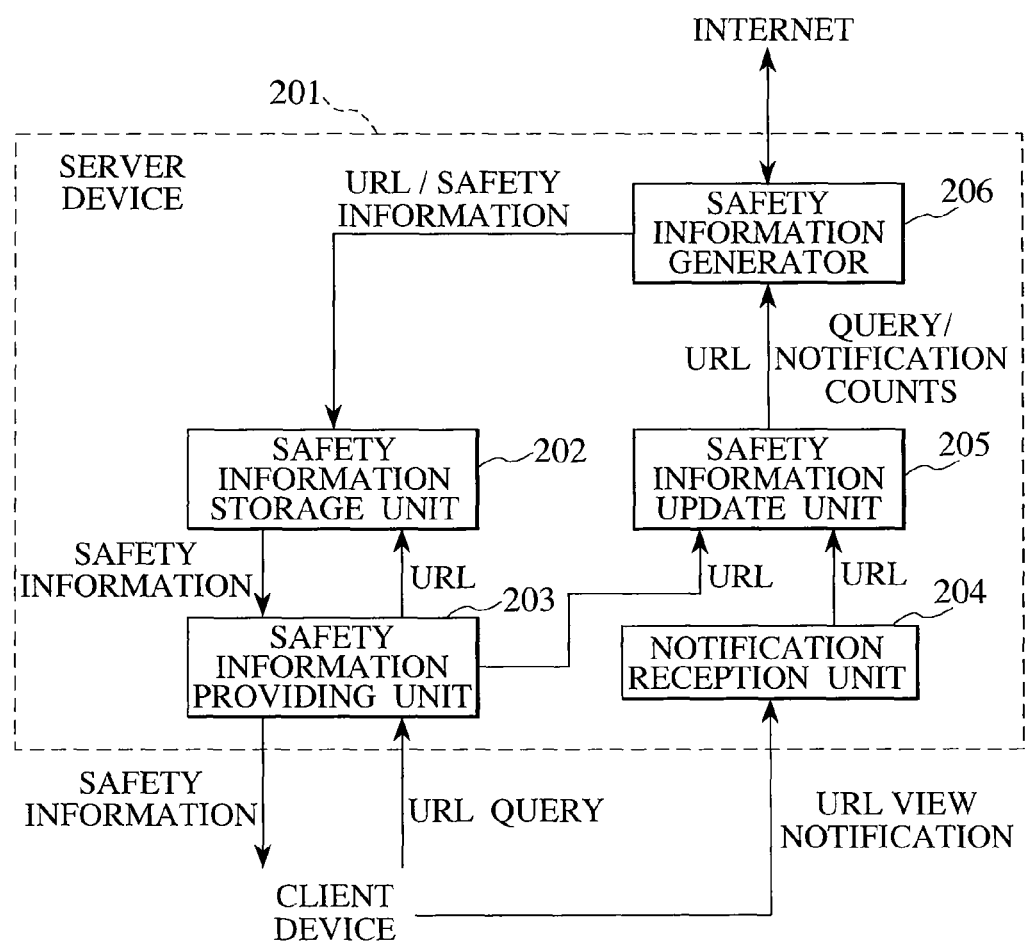
FIG. 2 is a schematic diagram illustrating the general configuration of a server device realized as a result of a server program operating on a server computer.

FIG. 2 is a schematic diagram illustrating the general configuration of a server device realized as a result of a server program operating on a server computer. Hereinafter, the description will refer to FIG. 2.

The server device 201 is provided with a safety information storage unit 202, a safety information providing unit 203, a notification reception unit 204, a safety information update unit 205, and a safety information generator 206.

Herein, the safety information storage unit 202 is a means that stores safety information with respect to individual URLs. It is typical for a storage medium such as the hard disk 104 of the server computer that realizes the server device 201 to be used.

Similarly to Web documents being crawled in a search engine, a Web document is acquired in advance (typically periodically), the Web document is analyzed, and its safety is determined and included in safety information. In addition, when there is a query from a client device regarding a URL Web document that was not acquired in advance, safety information is generated as necessary.

These processes are realized as a result of the CPU 102, the RAM 107, and the interface 109 cooperating to function as the safety information generator 206. In a process executed by a typical search engine, a Web document and keywords are weighted, but in a process of the present embodiment, a Web document and its safety information are associated with each other.

The following may be adopted as safety information for a given URL.

(a) A cached version of the Web document acquired from the URL.

(b) A document in text-format obtained by removing HTML tags from the Web document.

(c) A thumbnail image of how the Web document is assumed to be displayed in a browser.

(d) The number of queries from client devices regarding the Web document. It is assumed that the risk of the Web document is higher to the extent that this number is large.

(e) The number of notifications from client devices indicating that the Web document will be viewed. It is assumed that the safety of the Web document is high to the extent that this number is large.

(f) A risk/safety score obtained by passing the Web document through a Bayesian filter or other filter for measuring risk/safety. The score may also be calculated by taking into account the numbers of the above (d) and (e).

(g) A message associated with the score of the above (f). The message is equivalent to an explanatory note for informing the user of the safety/risk.

(h) Whether or not the URL is included in a separately-provided blacklist. For example, sites (URLs) that present only adult-oriented information, sites (URLs) that attempt fraudulent business practices, or sites (URLs) specified in spam emails may be registered in a separate blacklist, and the result of whether or not the URL matches a URL in the blacklist may be saved. The information herein may also be acquired by referencing the blacklist as necessary, without being directly stored in the safety information storage unit 202. In other words, the blacklist may also be thought of as one piece of information stored in the safety information storage unit 202. Entries in the blacklist may be registered manually by the administrator of the server device 201, or alternatively, notifications from users and external databases on the Internet may be referenced.

When there is a query specifying a URL from a client device, the safety information providing unit 203 acquires the safety information stored in the safety information storage unit 202 in association with the URL specified in the query, and provides the safety information to the client device as a response to the query.

In the case where the query URL has not been crawled in advance, the Web document of the URL is crawled in accordance with the query, safety information like the above is generated, and after first being registered in the safety information storage unit 202, the safety information is provided to the client device.

As described earlier, the number of queries is itself reflected in the safety information, and thus when the safety information providing unit 203 receives a query, the safety information update unit 205 updates the query count in the safety information storage unit 202 by 1 for that URL.

The notification reception unit 204 receives, from a client device, a notification of an URL selected by the user himself or herself for viewing in the browser screen on the client device.

As described earlier, the number of notifications is itself reflected in the safety information, and thus when the notification reception unit 204 receives a notification, the safety information update unit 205 updates the notification count in the safety information storage unit 202 by 1 for that URL.

As described earlier, since the safety information update unit 205 updates the safety information storage unit 202 with the query counts and notification counts, the safety information generator 206 may be launched as described above every time a query or notification is received, and a process to update the score, for example, may be executed.

In this way, the CPU 102 cooperates with the interface 109 to function as the safety information update unit 205, in addition to functioning as the safety information providing unit 203 as well as the notification reception unit 204.

Herein, even under conditions where a given URL is determined to be safe from the point of view of word frequency, when the ratio Y/X of the notification count Y versus the query count X is less than a predetermined threshold value, it is thought that users are avoiding accessing the given URL because they have themselves determined that the URL is dangerous. If the ratio Y/X is equal to or greater than the predetermined threshold value, then it is thought that users are accessing the given URL because they have themselves determined that the given URL is safe. Consequently, it is possible to adopt this Y/X ratio as one score, and then use the score to determine whether a URL is safe or dangerous.

In addition, the determination of "safe or dangerous" is thought to have a strong correlation with "high or low user opinion". Consequently, it is possible to use Y/X as a score of the "opinion towards the URL". Consequently, by accumulating the URL and its score, such information can be used for various marketing. Moreover, by using the score as a basis for determining whether or not to present advertising, suitable advertisements can be presented, as described later.

(Client Device)

Figure 3:
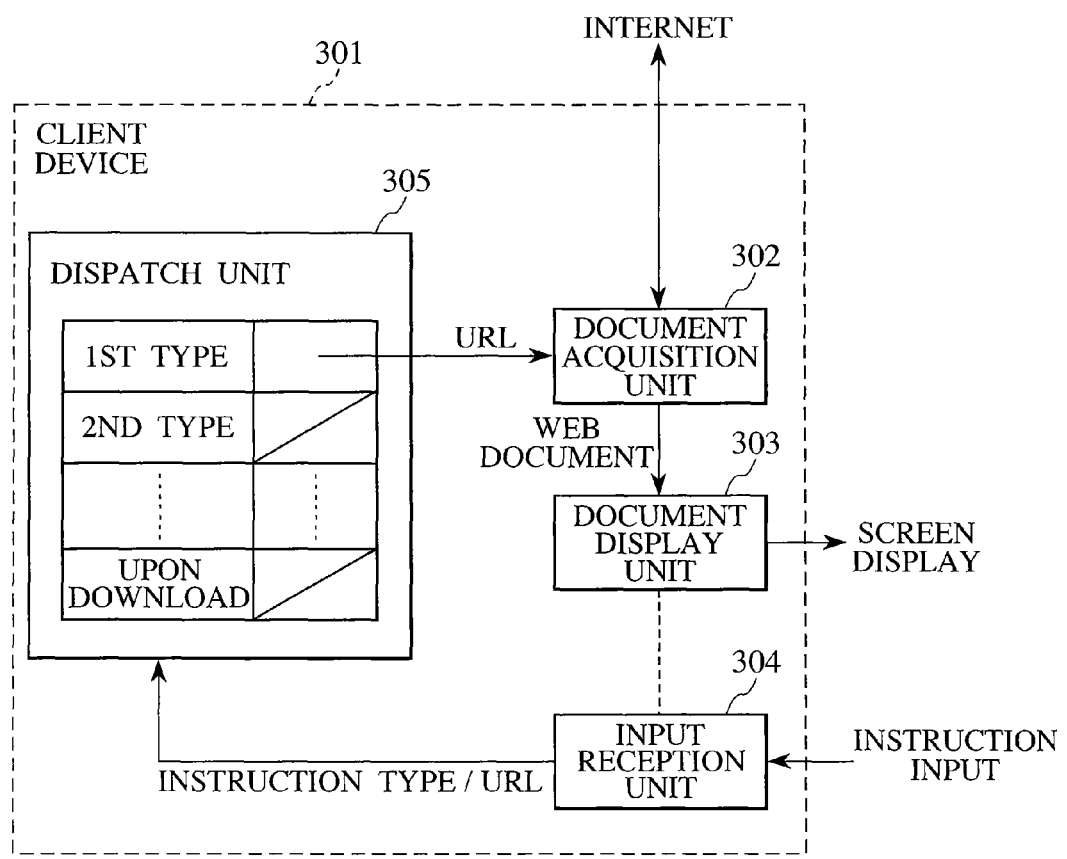
FIG. 3 is a schematic diagram illustrating the general configuration of a client device upon which a browser program operates.
Figure 4:
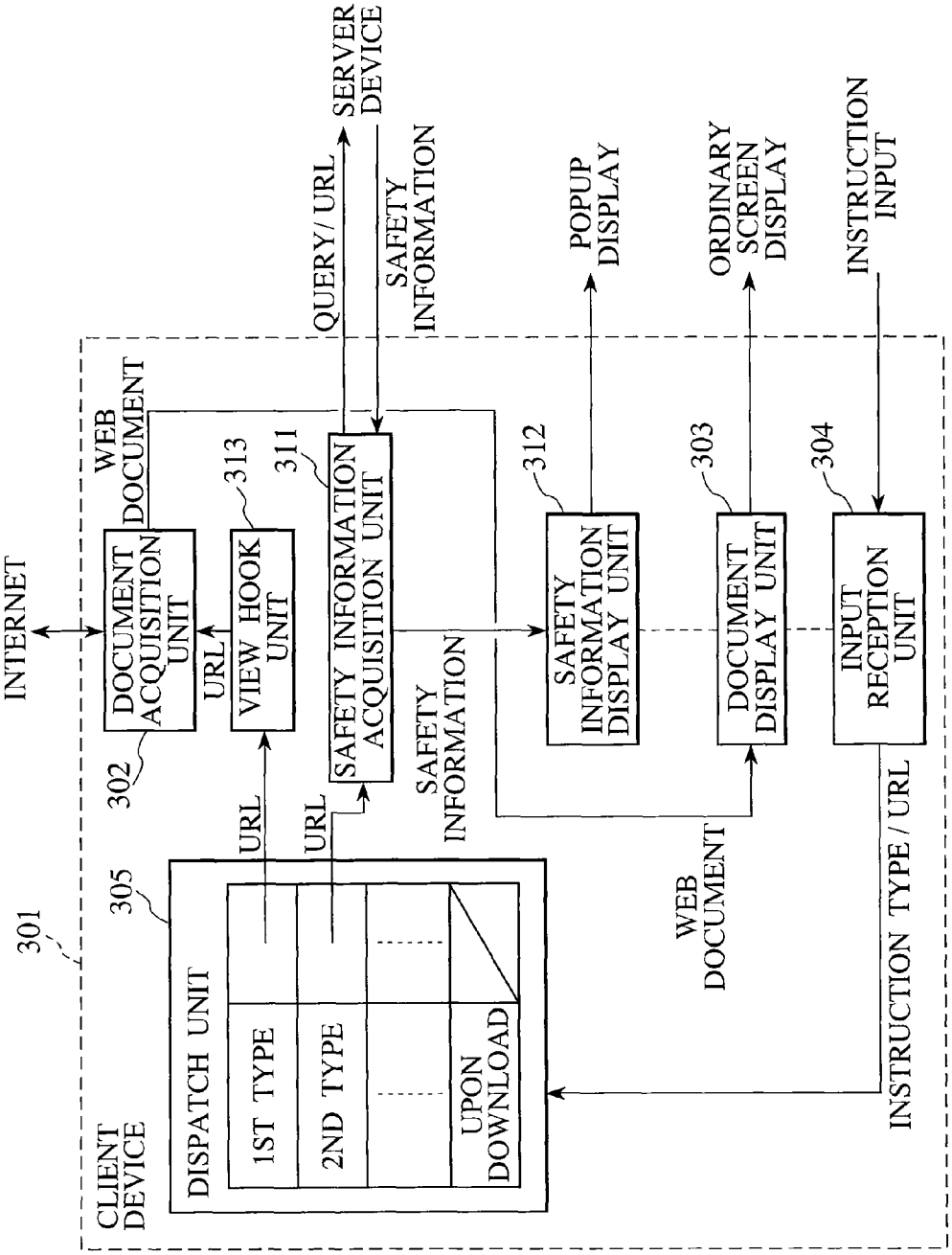
FIG. 4 is a schematic diagram illustrating the general configuration of a client device upon which operate a browser program as well as a plugin program that adds functions to the browser program.

FIG. 3 is a schematic diagram illustrating the general configuration of a client device upon which a browser program operates. FIG. 4 is a schematic diagram illustrating the general configuration of a client device upon which operate a browser program as well as a plugin program that adds functions to the browser program. Hereinafter, the description will refer to FIGS. 3 and 4.

More specifically, as a result of a browser program operating, the client computer functions as a client device 301 that includes a document acquisition unit 302, a document display unit 303, an input reception unit 304, and a dispatch unit 305, as shown in FIG. 3.

In addition, as a result of a plugin program also operating, the client computer additionally functions as a safety information acquisition unit 311, a safety information display unit 312, and a view hook unit 313, and functions are added to the client device 301.

First, the document acquisition unit 302 acquires a Web document associated with a provided URL from a computer communication network. The trigger whereby a URL is provided to the document acquisition unit 302 may occur when the user inputs a URL directly into the address bar of the browser, but it is typical for the user to select a document anchor already displayed on-screen by left-single-clicking. In the present disclosure, the dispatch unit 305 determines whether or not to provide a URL to the document acquisition unit 302 according to user instructions.

Consequently, the CPU 102 cooperates with the RAM 107 and the interface 109 to function as the document acquisition unit 302.

Meanwhile, when a Web document is acquired by the document acquisition unit 302, the document display unit 303 displays the acquired Web document on-screen. Typically, the Web document is a document in HTML format, and the document display unit 303 interprets the markup and displays a user-operable screen.

Consequently, under control by the CPU 102, and cooperating with components such as the RAM 107, the display device 108 functions as the document display unit 303.

Meanwhile, the input reception unit 304 receives a first type or second type instruction specifying a URL contained in the Web document displayed on-screen.

In the present embodiment, the following two types are assumed as the types of instructions.

(1) By left-single-clicking the anchor of a Web document displayed on-screen, the first type instruction specifying the URL of that anchor is input.

(2) By left-double-clicking the anchor of a Web document displayed on-screen, the second type instruction specifying the URL of that anchor is input.

Consequently, in this case, components such as the keyboard 105 and the mouse 106 function as the input reception unit 304. However, as described earlier, it is possible to suitably modify the combinations of associations between the instruction type and the physical operation of the keyboard 105 or the mouse 106.

Additionally, the dispatch unit 305 provides the URL specified by the instruction to a functional element associated with the instruction type in advance. The dispatch unit 305 can thus be thought of as conducting an event delegate handler process. The CPU 102 functions as the dispatch unit 305 by cooperating with components such as the RAM 107, which stores an association table of events and event handlers.

Herein, in the client device 301 shown in FIG. 3, the document acquisition unit 302 is associated with the first type instruction, while nothing is associated with the second type instruction. This represents default browser operation.

Consequently, when the first type instruction is input, the URL is provided to the document acquisition unit 302 via the dispatch unit 305, which acts as a trigger causing the Web document for that URL to be displayed on-screen by the document display unit 303. This operation is similar to operation in ordinary browsers such as Internet Explorer™, Netscape™, Opera™, and Firefox™.

In addition, when the second type instruction is input, the dispatch unit 305 ignores it since no associated functional element exists, and thus a special process is not executed. On the other hand, some kind of operation may also be associated with left-double-clicking as the default operation.

Meanwhile, in the client device 301 shown in FIG. 4, the view hook unit 313 is associated with the first type instruction, while the safety information acquisition unit 311 is associated with the second type instruction. Modification of these associations is conducted when the plugin program is loaded by the browser program.

Ordinary browsers like the above are often configured to allow installation of plugins for adding browser functions. Thus, in the present embodiment, user instructions with respect to anchors are made to be hooked.

Consequently, if the first type instruction (i.e., left-single-clicking an anchor) is input in an environment where the plugin program is installed, the URL is provided to the view hook unit 313.

The view hook unit 313 first notifies the server device 201 that the provided URL will be viewed, and then provides the URL to the document acquisition unit 302 so that processing similar to that of an ordinary left-single-click will be executed. In other words, the CPU 102 cooperates with components such as the interface 109 to function as the view hook unit 313.

The view hook unit 313 notifies the server device 201 which URL will actually be viewed on the client device. As described above, the view history (i.e., the view count) is reflected in the safety of the URL.

On the other hand, if the second type instruction (i.e., left-double-clicking an anchor) is input in an environment where the plugin program is installed, the URL is provided to the safety information acquisition unit 311.

The safety information acquisition unit 311 issues a query to the server device 201 specifying the URL, and as a response, acquires safety information for that URL.

Consequently, the CPU 102 cooperates with components such as the interface 109 to function as the safety information acquisition unit 311.

Upon acquiring the safety information, the safety information display unit 312 displays the acquired safety information near the location where the URL is displayed on the screen. Under conditions wherein a Web document is being displayed on-screen, an anchor represents the URL, and thus the position of the mouse cursor when the anchor was left-double-clicked is the position where the URL is displayed. Consequently, by saving the in-screen coordinates at the time the second type instruction occurred, safety information can be displayed near the URL.

In addition, since it is conceivable that the position of the mouse cursor will not vary greatly after double-clicking, the safety information may also be displayed near the mouse cursor.

It is also possible to display the safety information as a mouseover (i.e., information automatically displayed in a balloon, popup, status bar, or similar element when the mouse cursor is positioned near an anchor).

In this case, a technique can be adopted wherein once a given anchor is left-double-clicked and safety information is acquired, the tag attribute of the HTML with respect to that anchor is directly overwritten with the safety information, for example.

Consequently, under control by the CPU 102, and cooperating with components such as the RAM 107, the display device 108 functions as the safety information display unit 312.

Herein, as described earlier, if a safety information query is issued to the server device 201, that count is accumulated in the server device 201, and is reflected as safety information for that URL.

In addition, during plugin installation, it is also possible to assign the following operation to an event whereby a Web document is downloaded.

More specifically, a list of URLs contained in the anchor tags within a downloaded Web document may all be queried to the server device 201.

When the server device 201 is queried with a list, the safety information for each URL is not all provided, but instead a portion of the information is provided to the client device 301. (Typically, only the safety score is provided, or alternatively, an indication of whether or not the safety exceeds a fixed threshold value. This is hereinafter referred to as "simple safety information".) Also, when there are URLs for which safety information is not stored in the safety information storage unit 202, a message to that effect is immediately provided.

Upon being provided with the simple safety information, the display attributes of each anchor tag are configured according to the safety score. The configuration of display attributes can be easily realized by assigning a class to each anchor according to safety, and defining in advance a style sheet for display with respect to each class.

For example, configurations are possible wherein, according to safety, an icon is displayed following the place where an anchor is displayed on-screen (for example, displaying a skull mark or X mark icon for dangerous anchors, not displaying an icon for safe anchors, and displaying a question mark icon for uninspected anchors), or wherein anchors are displayed in strikethrough text.

When querying with a URL list, there is the possibility of many URLs being uninspected. Thus, when the server device 201 is queried, there might be a long time until a response. As described earlier, since immediate response is possible with the technique of modifying the display attributes of anchors when loading, the wait time for simple safety information is extremely short.

In the case where the server device 201 is queried with a URL list having uninspected URLs therein, it is typical to initiate a crawl after providing the client device 301 with the simple safety information.

Additionally, the embodiment is configured such that, when the user left-double-clicks an anchor, detailed safety information for that URL is provided from the server device 201. (Hereinafter, such information is referred to as "detailed safety information". This information is equivalent to the safety information provided in the foregoing embodiment.)

In such an embodiment, URLs cached in the server device 201 in advance can be easily determined to be safe or dangerous with the simple safety information, while for non-cached URLs, a message to that effect is provided, and detailed safety information is acquired for the client device 301 only upon user request.

In so doing, the safety information required by individual users can be accurately provided with short wait times.

Similar to the above, the event handler process when downloading or displaying a Web document in this way is dispatched by the dispatch unit 305 and executed by the CPU 102 in cooperation with components such as the interface 109.

Herein, in a mode that performs a URL list query when downloading as in the present embodiment, downloading is equivalent to initiating display of the Web document, while single-clicking is equivalent to ending display of the Web document.

Consequently, from operations performed by the user between the start of downloading and until single-clicking, it is possible to acquire:

(a) which URLs for which simple safety information was acquired;

(b) which URLs for which detailed safety information was acquired; and (c) whether or not detailed safety information was acquired for the URL viewed next.

Thus, as a result of the view hook unit 313 notifying the server device 201 with such information, the following statistical information can be acquired at the server device 201:

(a) a count A of the number of times simple safety information was acquired for a given URL (i.e., a count of the number of times a Web document containing that URL was displayed);

(b) a count B of the number of times detailed safety information was acquired for a given URL:

(c) a count C of the number of times a given URL was viewed after acquiring its detailed safety information;

(d) a count D of the number of times a given URL was not viewed after acquiring its detailed safety information;

(e) a count E of the number of times a given URL was viewed without acquiring its detailed safety information; and (f) a count F of the number of times a given URL was not viewed without acquiring its detailed safety information.

Among these statistical quantities, conjectures like the following are obtained, for example.

(1) If B/A is large, the risk of that URL is high.
(2) If C/B is large, the risk of that URL is low.
(3) If D/B is large, the risk of that URL is high.
(4) If E/A is large, the risk of that URL is low.

Consequently, by taking these count parameters into account, it becomes possible to estimate the safety/risk of each URL. For example, in the case where the above parameters (1) to (4) are taken into to account to calculate a risk score, a method is possible wherein the risk score is taken to be the result of respectively multiplying the parameters where the risk rises with larger values by positive coefficients, multiplying the opposite parameters by negative coefficients, and then summing.

A variety of modes are conceivable depending on which parameters are adopted to calculate risk/safety. For example, the count of safety information queries in the foregoing embodiment is equivalent to B=C+D, while the count of view notifications is equivalent to C, and thus it is possible to conceive of special examples of score calculation in the present embodiment.

Furthermore, during score calculation, a frequency vector cosine law may be considered for word frequency, or a Bayesian filter or other document classification method may be adopted. Having done so, a technique can be applied wherein a weighted average or other combination of these scores and the above score is adopted.

Figure 5:
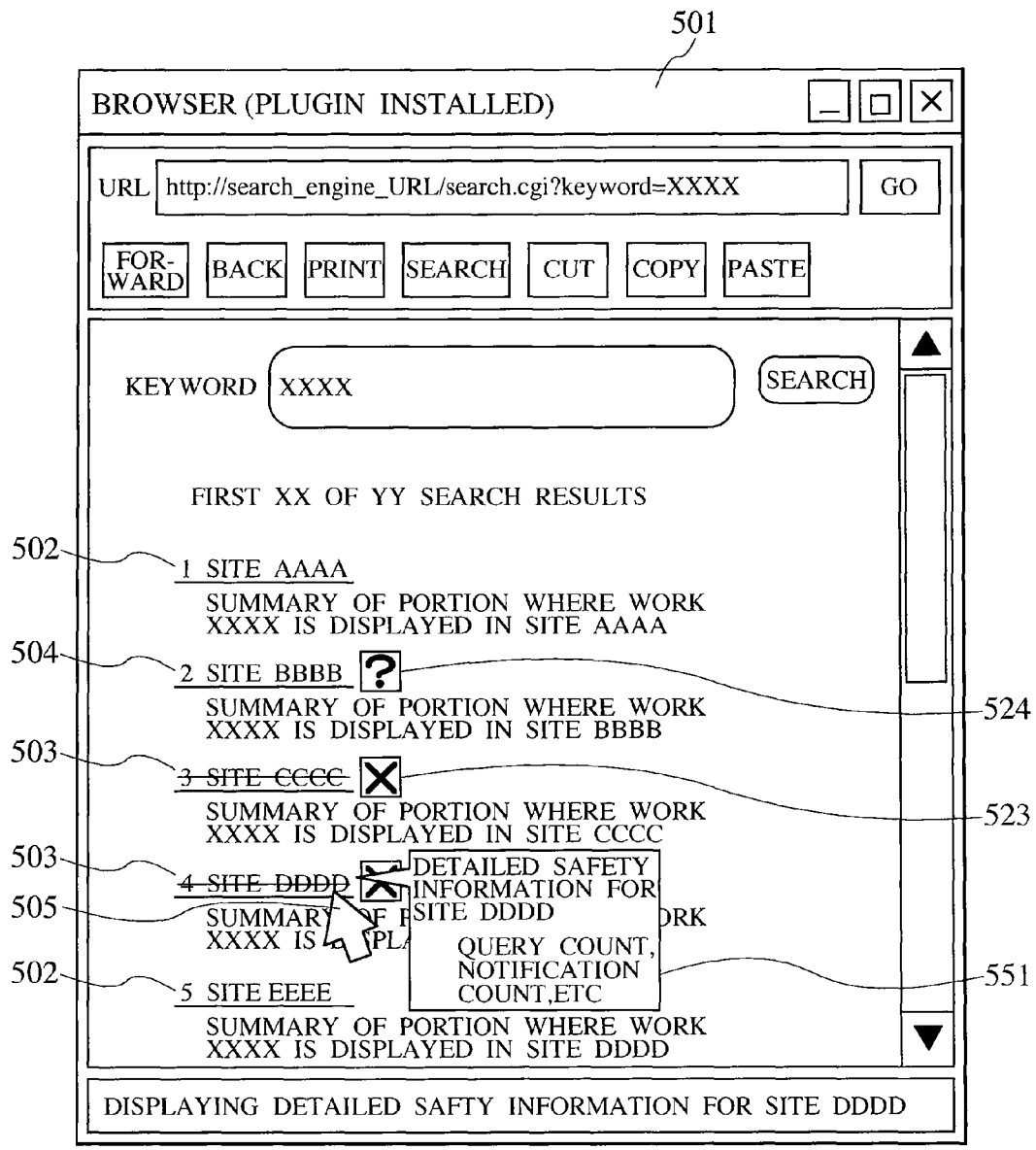
FIG. 5 is an explanatory diagram illustrating an exemplary display in accordance with the present embodiment.

FIG. 5 is an explanatory diagram illustrating how information is displayed on-screen in such an embodiment. Hereinafter, the description will refer to FIG. 5.

In FIG. 5, the results of searching for a word "XXXX" using a search engine from a browser window 501 are displayed.

The search result anchors 502, 503, and 504 are displayed underlined, which indicates that the anchors are links to another URL.

First, a special icon is not displayed for the anchor 502, which leads to a site considered safe.

On the other hand, an X icon 523 is displayed near the anchor 503, which leads to a site determined to be dangerous, while in addition, the anchor itself is displayed in strikethrough text.

In addition, a ? icon 524 is displayed near the anchor 504, which leads to a site that is still uninspected.

If the user double-clicks any one of the anchors 502, 503, or 504 by operating the mouse cursor 505, detailed safety information for the URL corresponding to that anchor is presented in a popup display 551.

In the popup display 551, there is displayed information such as safety of the anchor destination URL, the count of the number of times that detailed safety information for that URL has been queried (i.e., the query count), and the count of the number of times that the URL has been viewed (i.e., the notification count).

In this way, according to the present embodiment, the user is able to look up appropriate safety information as necessary while maintaining the sense of using an ordinary browser. Moreover, since statistical information regarding the number of times detailed safety information was acquired and the number of times that ended up in an actual view action is reflected in the safety information itself, the user is able to make more appropriate determinations of a site's safety/risk.

Herein, a technique is also conceivable wherein the simple safety information and the detailed safety information is taken to include advertising information associated with the URL, and such ads are displayed near the icons expressing risk/safety. Particularly, since a URL determined to be highly safe conceivably also has a high opinion from typical users, effective ads can be provided by displaying ads in a popup in conjunction with URLs determined to be low-risk in the above determination standard, or by adding anchors to ad destinations to the Web document, for example.

Embodiment 2

In the foregoing embodiment, a single client device 301 is included in a Web document with respect to a single server device 201. Although a mode was described wherein safety information related to a URL is sought, an information providing system in accordance with the present embodiment is much more generalized than the above.

More specifically, a Web document is an assembly of text made up of a plurality of characters. Consequently, it might be desirable to acquire information associated with the text contained in the Web document from a third party different from the entity providing the Web document. For example, there are conditions where, for a given Japanese text, it is desirable to obtain English translation associated information, Chinese translation associated information, or Korean translation associated information. There are conditions where, for a given English word, it is desirable to obtain associated information providing its meaning from an English-Japanese dictionary, associated information providing synonyms and antonyms from a thesaurus, associated information providing the results of a search for usage examples and usage frequency from the Web, or associated information providing ads having a high affinity with that term.

Figure 6:
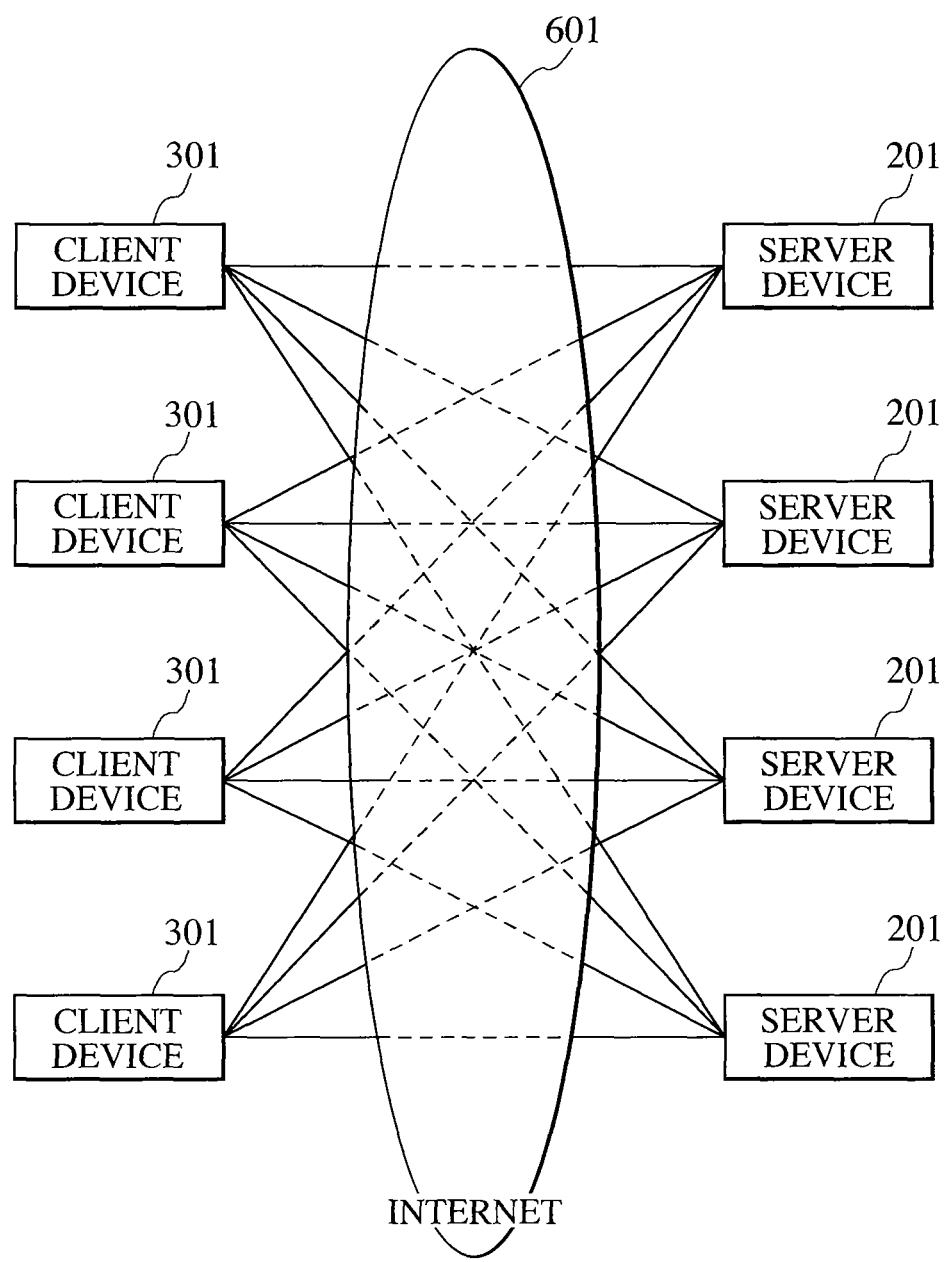
FIG. 6 is a schematic diagram illustrating the general configuration of the present information providing system.

FIG. 6 is a schematic diagram illustrating the general configuration of the present information providing system. Hereinafter, the description will refer to FIG. 6.

As shown in FIG. 6, there exist a plurality of client devices 301 and server devices 201 in the present information providing system, wherein many-to-many information provision is conducted by communicating via the Internet 601. Consequently, in each client device 301, it is necessary to appropriately present to a user associated information provided from a plurality of server devices 201.

Figure 7:
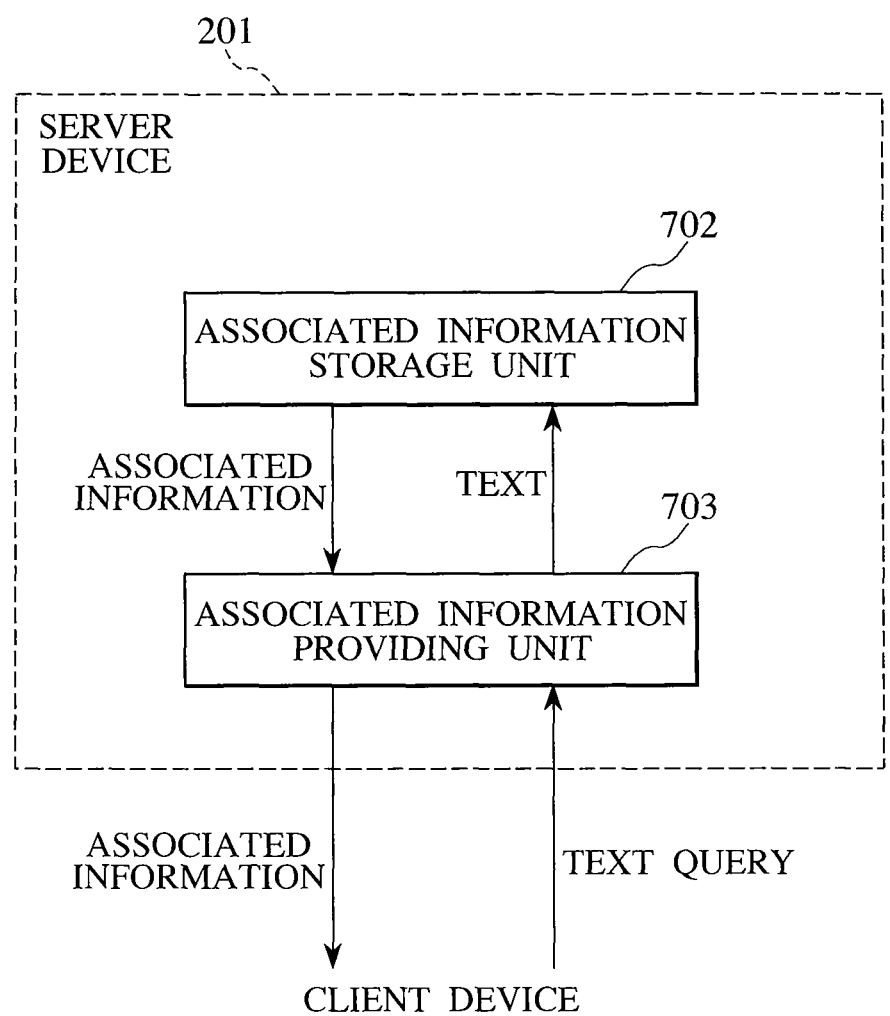
FIG. 7 is a schematic diagram illustrating the general configuration of a server device of the present information providing system.

FIG. 7 is a schematic diagram illustrating the general configuration of a server device of the present information providing system. Hereinafter, the description will refer to FIG. 7.

The associated information storage unit 702 and the associated information providing unit 703 in a server device 201 in the present embodiment are generalizations of the safety information storage unit 202 and the safety information providing unit 203 in the foregoing exemplary embodiment, which store in advance and provide information associated with text queried from a client device 301. The text in this case is not limited to being a URL.

As described earlier, if there exists associated information for the text, it is possible to accumulate and provide that information, regardless of type.

Figure 8:
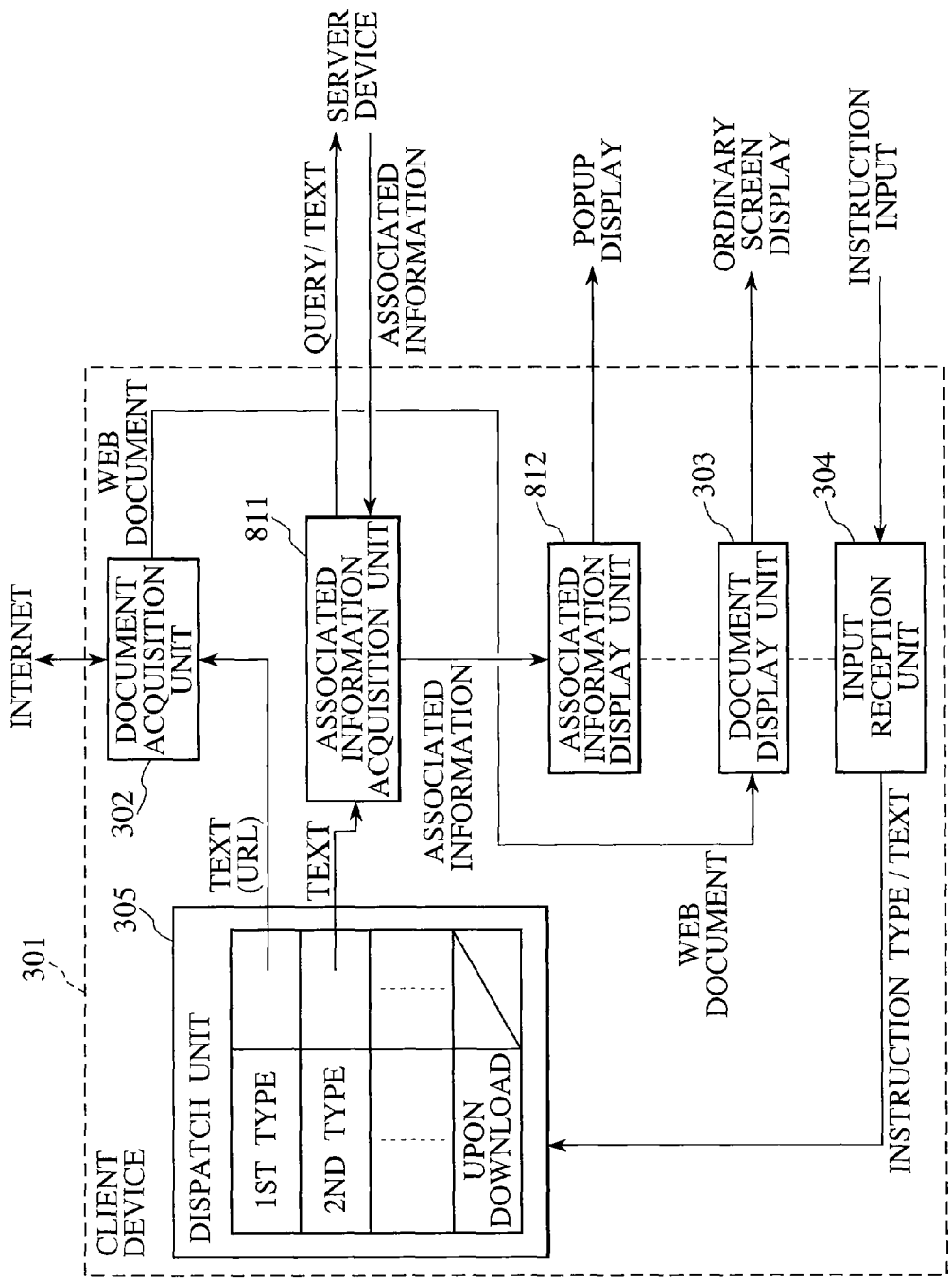
FIG. 8 is a schematic diagram illustrating the general configuration of a client device installed with the plugin of the present information providing system.

FIG. 8 is a schematic diagram illustrating the general configuration of a client device in accordance with the present information providing system.

Similarly to the foregoing embodiment, a client device like that shown in FIG. 8 is configured in the present embodiment by installing a plugin program onto a client device like that shown in FIG. 3.

The associated information acquisition unit 811 and the associated information display unit 812 in a client device 301 in the present embodiment are generalizations of the safety information acquisition unit 311 and the safety information display unit 312 in the foregoing exemplary embodiment. Also, the input reception unit 304 provides the dispatch unit 305 with text specified by a user in the client device 301. The text in this case is not limited to being a URL.

Besides the above, the view hook unit 313 in the foregoing embodiment is omitted, and the first type instruction is taken to be passed directly to the document acquisition unit 302. Herein, a mode that does not omit the view hook unit 313 may also be adopted.

In the present embodiment, when a link to another URL is clicked with a mouse 106 in a Web browser, the action is received as the first type instruction, with the URL being specified as text in the instruction.

In addition, when a portion other than a link to another URL is clicked with the mouse 106, or when an arbitrary position in the document is double-clicked with the mouse 106, text near the position specified by the mouse 106 is extracted, and the action is received as the second type instruction specifying the extracted text.

At this point, the technique for extracting nearby text may be taken to be extracting a string of predetermined length before and after the position specified by the mouse 106. Alternatively, the technique may be taken to be adopting text expressed by a DOM (Document Object Model) containing the position specified by the mouse 106, such as the text contained in a region enclosed by the HTML tags surrounding the position, for example. It is typical to extend the range of the DOM to be extracted until the text within the DOM exceeds a minimum number of characters or a minimum number of words, and then extract the text once the minimum number of characters or minimum number of words has been exceeded.

In addition, it is also possible to adopt a mode wherein, after selecting a region of the Web document with a method like that used for copy and paste, the second type instruction specifying the text contained in the region is input by double-clicking, or by displaying a menu by right-clicking the text contained in the selected region, and then selecting a menu item such as "Acquire associated items" from the menu.

Figure 9:
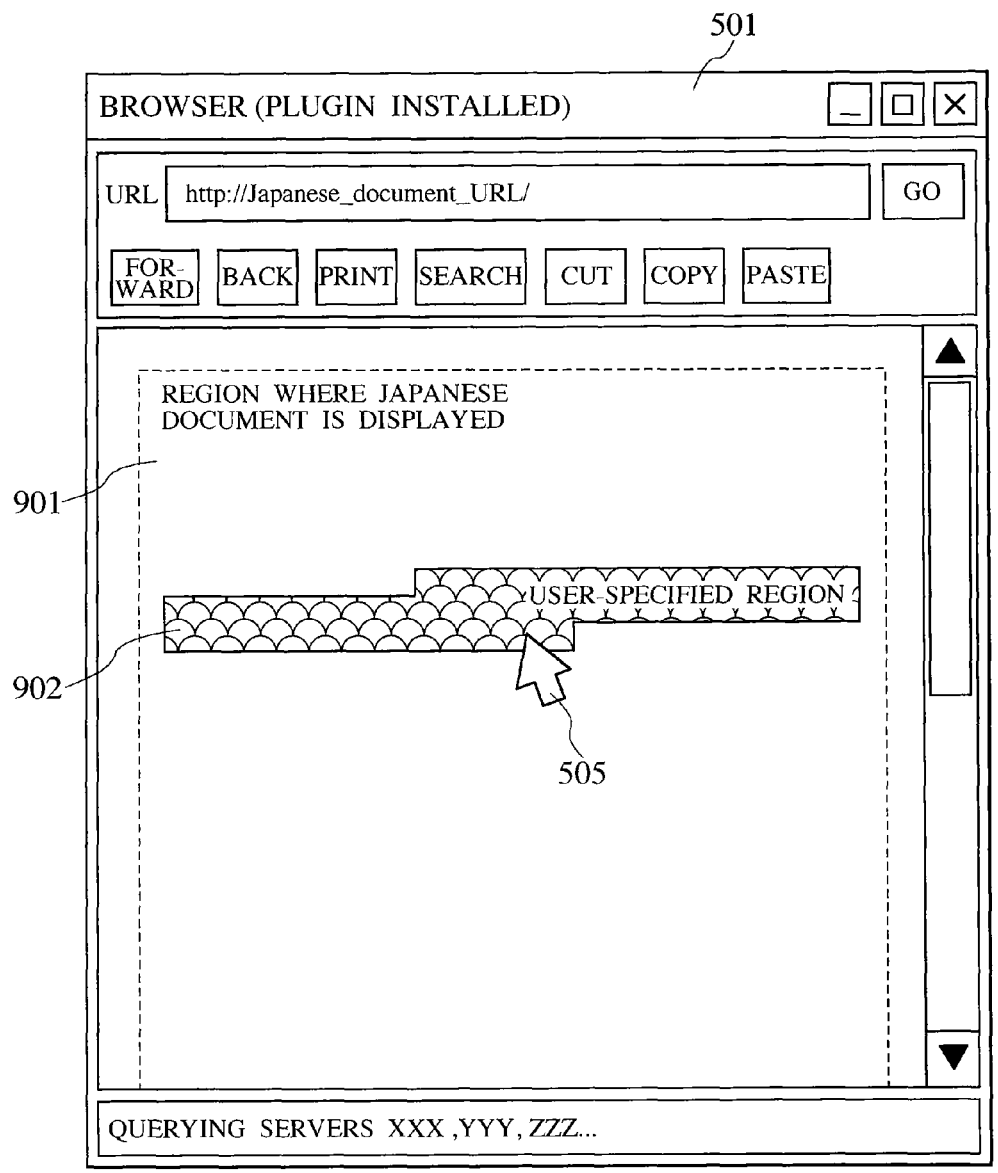
FIG. 9 is an explanatory diagram illustrating an exemplary display in the present embodiment.
Figure 10:
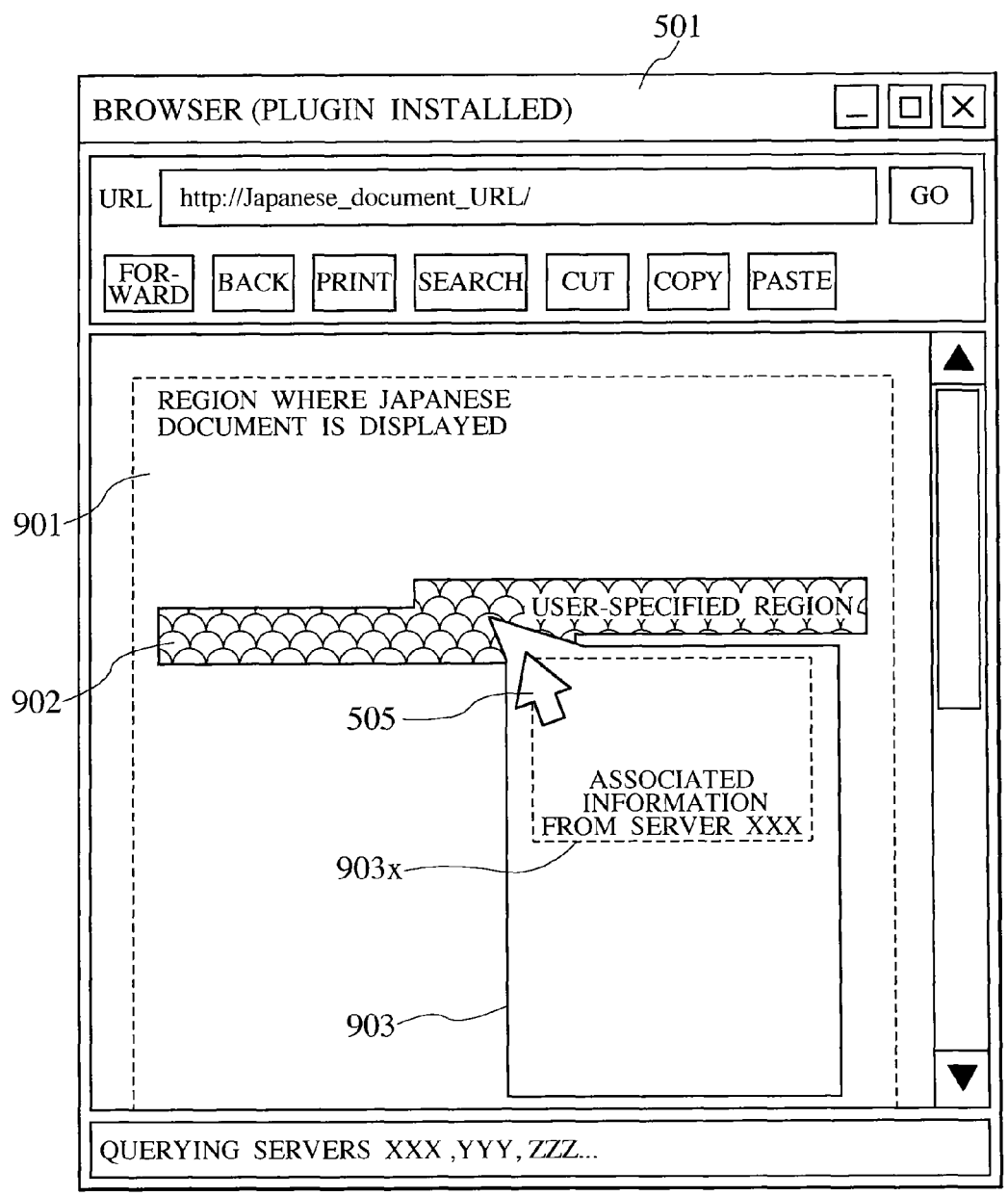
FIG. 10 is an explanatory diagram illustrating an exemplary display in the present embodiment.
Figure 11:
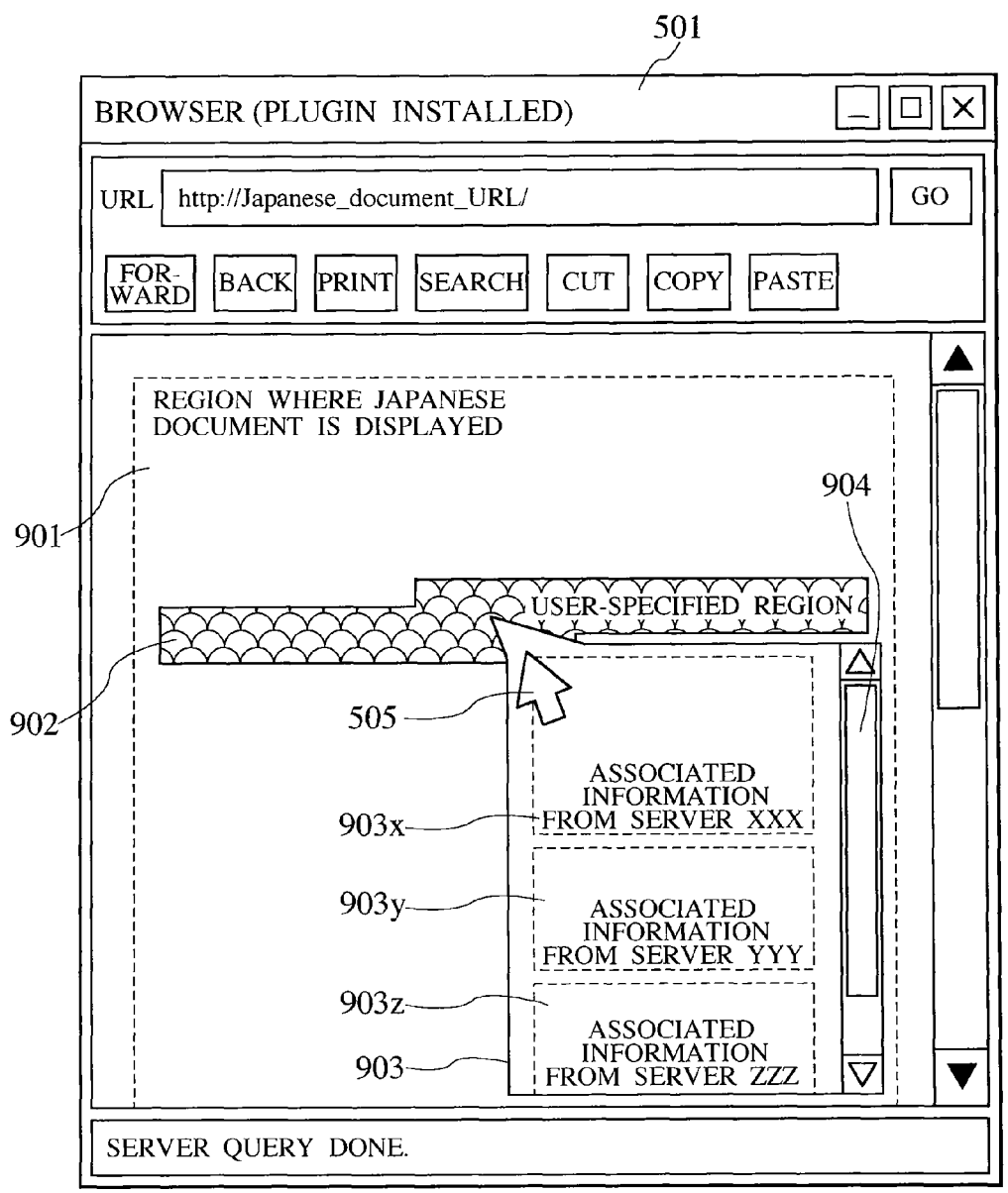
FIG. 11 is an explanatory diagram illustrating an exemplary display in the present embodiment.

FIGS. 9, 10, and 11 are explanatory diagrams illustrating exemplary displays in the present embodiment. Hereinafter, the description will refer to FIGS. 9, 10, and 11.

FIG. 9 illustrates how a user uses a mouse to specify a desired region 902 from a region 901 displaying a Japanese document within a browser display window 501. When specifying the desired region 902, it is typical for the text contained in the region 902 to be inverted/highlighted.

Moreover, when the region 902 is double-clicked, the second type instruction is issued, and the associated information acquisition unit 811 queries a plurality of server devices 201 (XXX, YYY, ZZZ) registered in advance by the user in the plugin program with the text contained in the region 902.

In FIG. 10 is a display example for the case where there is a response from a single server XXX from among the plurality of server devices.

Upon obtaining associated information with respect to the query from any one of the server devices 201, a popup region 903 pops up by the mouse cursor 505 near the user-specified region 902.

Subsequently, the associated information from the server XXX is displayed in the leading portion 903x of the popup region 903.

In FIG. 11 is a display example for the case where there are responses from all servers. In FIG. 11, there are responses from the server devices 201 in the order XXX, YYY, ZZZ, and associated information is presented inside the popup region 903 in that order. The popup region 903 is made to be scrollable using a scroll bar 904. Besides being able to view the associated information in the order of arrival, the user is able to collectively view the associated information inside the popup region 903, and is thus able to discriminate among the information in an easy-to-understand way.

In the above example, associated information from a plurality of server devices 201 is taken to be sequentially displayed in a single popup region 903. However, different popup regions 903 may also be prepared for each server device 201.

Figure 12:
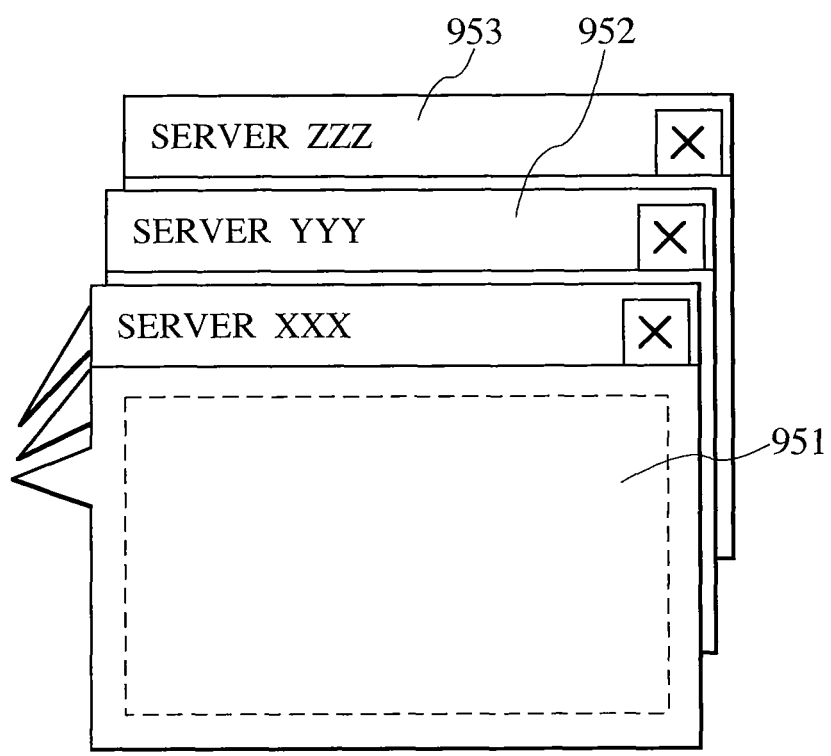
FIG. 12 is an explanatory diagram illustrating an exemplary display presenting associated information by means of a plurality of popup regions.

FIG. 12 is an explanatory diagram illustrating a display example presenting associated information by means of a plurality of popup regions. Hereinafter, the description will refer to FIG. 12.

In the display example shown in FIG. 12, from among the server devices 201, associated information from XXX is displayed inside a balloon-type popup window 951, associated information from YYY is displayed inside a balloon-type popup window 952, and associated information from ZZZ is displayed inside a balloon-type popup window 953.

Also, these popup windows 951, 952, and 953 are generated and displayed once the associated information arrives from the server devices 201.

The titles displayed at the top of each popup window 951, 952, and 953 indicate the name of a server device. In order for these title portions to be visible, the popup windows 951, 952, and 953 are displayed stacked at slightly shifted places. Also, a popup window can be closed if the X symbol at the right edge of its title portion is clicked.

Although it is customary for popup windows to be displayed stacked such that newly generated windows appear in front, in the present embodiment, newly generated popup windows are displayed stacked in the back.

Consequently, FIG. 12 illustrates conditions wherein associated information first arrived from XXX, then arrived from YYY, and lastly arrived from ZZZ.

When the user desires to view the contents of a popup window in the back, the user clicks the title portion of the window. In so doing, a third type instruction specifying the window title is issued, and the dispatch unit 305 notifies the associated information display unit 812 with the window title. Subsequently, the associated information display unit 812 moves the window to the front.

By executing such processing, the user becomes able to suitably acquire associated information from a plurality of server devices 201, while also minimizing the travel distance of the mouse cursor 505.

In the above embodiment, when displaying associated information, the associated information is displayed by producing a popup window near the corresponding text. However, another technique may be adopted wherein text information or markup information expressing the associated information can be additionally inserted into the DOM itself of the user-specified region. In so doing, the associated information is displayed near the text by altering the displayed document itself by means of the browser.

When adopting this technique, there is the advantage that the original text is not hidden by the popup display. However, the appearance of the displayed document changes as a result of inserting the associated information. Consequently, it is preferable to display in conjunction with the associated information a button or other element for canceling display of the associated information, and prepare an event handler such that when the user clicks the button, the data that was additionally inserted is deleted from the DOM.

It is possible to realize these functions by means of a browser-embedded scripting language.

Additionally, in this application, priority is claimed on the basis of the applications given below, and the content of the basis applications is incorporated herein to the extent permitted by the laws of the designated countries.

(a) Japanese Patent Application No. 2007-169642 (filed on Jun. 27, 2007)

(b) Japanese Patent Application No. 2007-339395 (filed on Dec. 28, 2007)

As described in the foregoing, according to the present disclosure, there can be provided a check system favorable for easily checking the safety of a Web document before viewing on a browser, a computer-readable information recording medium containing a program executed on a computer that constitutes such a check system, an information providing system favorable for viewing information associated with text in a Web document being viewed in a browser, and to a computer-readable information recording medium containing a program executed on a computer that constitutes such an information providing system.

What is claimed is:

1. A non-transitory computer-readable information recording medium comprising a plugin program that when read by a client device, causes the client device to:
   extract, from a Web document being displayed within a browser display window on a screen, text contained within a region of the Web document which is specified by a user moving a mouse cursor over the text;
   in response to the extracting, send queries having said text to at least three servers previously registered by the user in the plugin program;
   receive, in response to the queries, information from each of the at least three servers;
   generate a popup window for each of the received information, wherein the information from each respective server of the at least three servers is associated with a different popup window;
   display one of the generated popup windows corresponding to first arrived information of the information received from the at least three servers on the screen in front of a portion of said Web document;
   display each of the generated popup windows corresponding to later arriving information from the at least three servers on the screen so that each said generated popup window is displayed shifted and stacked behind any of the generated popup windows already displayed on the screen, wherein a title portion of each of said generated popup windows is visible on the screen;
   receive user input that specifies the title portion of one of the displayed popup windows which is shifted and stacked behind other displayed popup windows; and
   responsive to the user input, move the displayed popup window associated with the specified title portion in front of all of the other popup windows already displayed on the screen.

* * * * *